(12) United States Patent
Garner, IV et al.

(10) Patent No.: US 10,546,299 B1
(45) Date of Patent: Jan. 28, 2020

(54) FRAUDULENT ACTIVITY SHELL

(71) Applicant: Wells Fargo Bank, N.A., Charlotte, NC (US)

(72) Inventors: Andrew J. Garner, IV, State Road, NC (US); Matthew Martinez, San Francisco, CA (US); Beth S. Moss, Danville, CA (US); Jennifer G. Spratley, Charlotte, NC (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 533 days.

(21) Appl. No.: 14/743,378

(22) Filed: Jun. 18, 2015

(51) Int. Cl.
*G06Q 20/40* (2012.01)

(52) U.S. Cl.
CPC ......... *G06Q 20/4016* (2013.01); *G06Q 20/40* (2013.01)

(58) Field of Classification Search
USPC .......................................................... 705/44
See application file for complete search history.

(56) References Cited

U.S. PATENT DOCUMENTS

| | | | |
|---|---|---|---|
| 5,878,258 A * | 3/1999 | Pizi | G06F 9/451 719/320 |
| 7,505,758 B2 | 3/2009 | Choi | |
| 7,546,639 B2 | 6/2009 | Bantz et al. | |
| 7,710,289 B2 | 5/2010 | Liu et al. | |
| 8,280,347 B2 | 10/2012 | Azimi et al. | |
| 8,483,659 B2 | 7/2013 | Mahajan | |
| 8,483,663 B1 | 7/2013 | Jones | |
| 8,509,212 B2 | 8/2013 | Sanjeev et al. | |
| 8,549,643 B1 | 10/2013 | Shou | |
| 2004/0111578 A1 * | 6/2004 | Goodman | G06F 21/53 711/163 |
| 2004/0203601 A1 | 10/2004 | Morriss et al. | |
| 2005/0235139 A1 * | 10/2005 | Hoghaug | G06F 9/451 713/2 |

(Continued)

FOREIGN PATENT DOCUMENTS

WO  2013135898 A1  9/2013

OTHER PUBLICATIONS

Ristenpart, Thomas, Gabriel Maganis, Arvind Krishnamurthy, and Tadayoshi Kohno, Privacy-Preserving Location Tracking of Lost or Stolen Devices: Cryptographic Techniques and Replacing Trusted Third Parties with DHTs, USENIX Security Symposium, 2008, http://www.sysnet.ucsd.edu/cryptosec/miscpapers/devtrack-usesec08.pdf.

(Continued)

*Primary Examiner* — William J Jacob
(74) *Attorney, Agent, or Firm* — Walter Haverfield LLP; James J. Pingor

(57) ABSTRACT

Systems, methods, and other embodiments associated with a fraudulent activity shell. According to one embodiment, a system includes an application having a normal environment and a shell environment. The system also includes a trigger logic that determines whether an action satisfies a trigger condition. In response to determining that the action satisfies the trigger condition, the trigger logic triggers the application to enter a fraudulent activity mode from a default mode. In the fraudulent activity mode, the normal environment is configured to hold the action. The shell environment is configured to display the action as executed in the fraudulent activity mode.

16 Claims, 5 Drawing Sheets

(56) References Cited

U.S. PATENT DOCUMENTS

| | | | |
|---|---|---|---|
| 2006/0123101 A1* | 6/2006 | Buccella | G06F 21/552 709/223 |
| 2006/0248011 A1* | 11/2006 | Hecht-Nielsen | G06Q 20/02 705/44 |
| 2007/0101155 A1* | 5/2007 | Hoghaug | G06F 21/31 713/189 |
| 2008/0288405 A1* | 11/2008 | John | G06Q 20/40 705/44 |
| 2009/0213844 A1* | 8/2009 | Hughston | H04M 3/4872 370/352 |
| 2009/0249460 A1 | 10/2009 | Fitzgerald et al. | |
| 2009/0253410 A1 | 10/2009 | Fitzgerald et al. | |
| 2010/0210240 A1 | 8/2010 | Mahaffey et al. | |
| 2012/0083292 A1 | 4/2012 | Yeo et al. | |
| 2012/0171998 A1 | 7/2012 | Kang | |
| 2013/0024376 A1* | 1/2013 | Choudhuri | G06Q 40/00 705/44 |
| 2014/0055812 A1* | 2/2014 | DeRoller | H04N 1/00854 358/1.15 |
| 2014/0082099 A1 | 3/2014 | Burns et al. | |

OTHER PUBLICATIONS

Friedman, Jon and Daniel V. Hoffman, Protecting data on mobile devices: A taxonomy of security threats to mobile computing and review of applicable defenses, Information Knowledge Systems Management, Enterprise Mobility: Applications, Technologies and Strategies, Apr. 2, 2008, pp. 159-180, vol. 7 Issue 1, http://books.google.com/books? hl=en&lr=lang_en&id=0Lz_wQDtCmMC&oi=fnd&pg=PA159&ots=uKPYhUQzFG&sig=8LXelhsXHvqFPz0aznWrFrbm7uc#v=onepage&q&f=false.

Muslukhov, Ildar, Yazan Boshmaf, Cynthia Kuo, Jonathan Lester, and Konstantin Beznosov, Understanding Users' Requirements for Data Protection in Smartphones, Data Engineering Workshops (ICDEW), 2012 IEEE 28th International Conference, http://137.82.84.194/record/271/files/271.pdf.

* cited by examiner

FRAUDULENT ACTIVITY SHELL

BACKGROUND

Banks employ safeguards to protect users from fraudulent activities. For example, an action may be temporarily held so that data associated with the action can be scrutinized for potential fraud. In the event the action is deemed legitimate, the action is released from the hold and the action is executed. Accordingly, these safeguards may impact authorized users by delaying actions. Also, if an action is deemed potentially fraudulent, the hold on the action becomes permanent such that the action is effectively denied. Accordingly, the fraudster is aware that the action has been denied. This may inform the fraudster that an account associated with the action is being scrutinized for fraud thereby causing the fraudster to move on to a different account.

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

As discussed above, current safeguards may negatively impact legitimate users and inadvertently reveal to a fraudster that an account is being scrutinized. Described herein are examples of systems, methods, and other embodiments associated with a fraudulent activity shell. The systems, methods, and other embodiments described herein include an application having both a normal environment and a shell environment. The normal environment executes requests and actions that can result in external actions, during a user session. For example, the normal environment is able to initiate actions with external systems such as fund transfers, wires, securities orders, etc. A user session is established via typical validation and authentication methods. The shell environment is not capable of executing external actions. Instead, the shell environment mirrors the normal environment. However, if an action is deemed potentially fraudulent, then the shell environment deviates from the normal environment. Specifically, a potentially fraudulent action is halted in the normal environment when the action or a sequence of actions is deemed fraudulent, but appears to progress in the shell environment. The fraudster may have access to the shell environment, but not the normal environment. Accordingly, to the fraudster the action may appear to be executed because the fraudster is viewing the shell environment.

By allowing potentially fraudulent actions appear to progress in the shell environment, fraudsters are not inadvertently alerted that fraudulent behavior has been detected, traced, and/or tracked. Additionally, legitimate users experience less delay because actions appear to have been executed in the shell environment without the delay of scrutiny. Thus, the actions appear to be executed immediately, while the actions may be scrutinized in the normal environment. Accordingly, the system continues to protect valid users, whose activity may merit additional scrutiny or contact with the valid customer, by not blocking or delaying the valid actions or locking the valid users out of the system.

The following description and drawings set forth certain illustrative aspects and implementations. These are indicative of but a few of the various ways in which one or more aspects may be employed. Other aspects, advantages, or novel features of the disclosure will become apparent from the following detailed description when considered in conjunction with the drawings.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Figure 1:
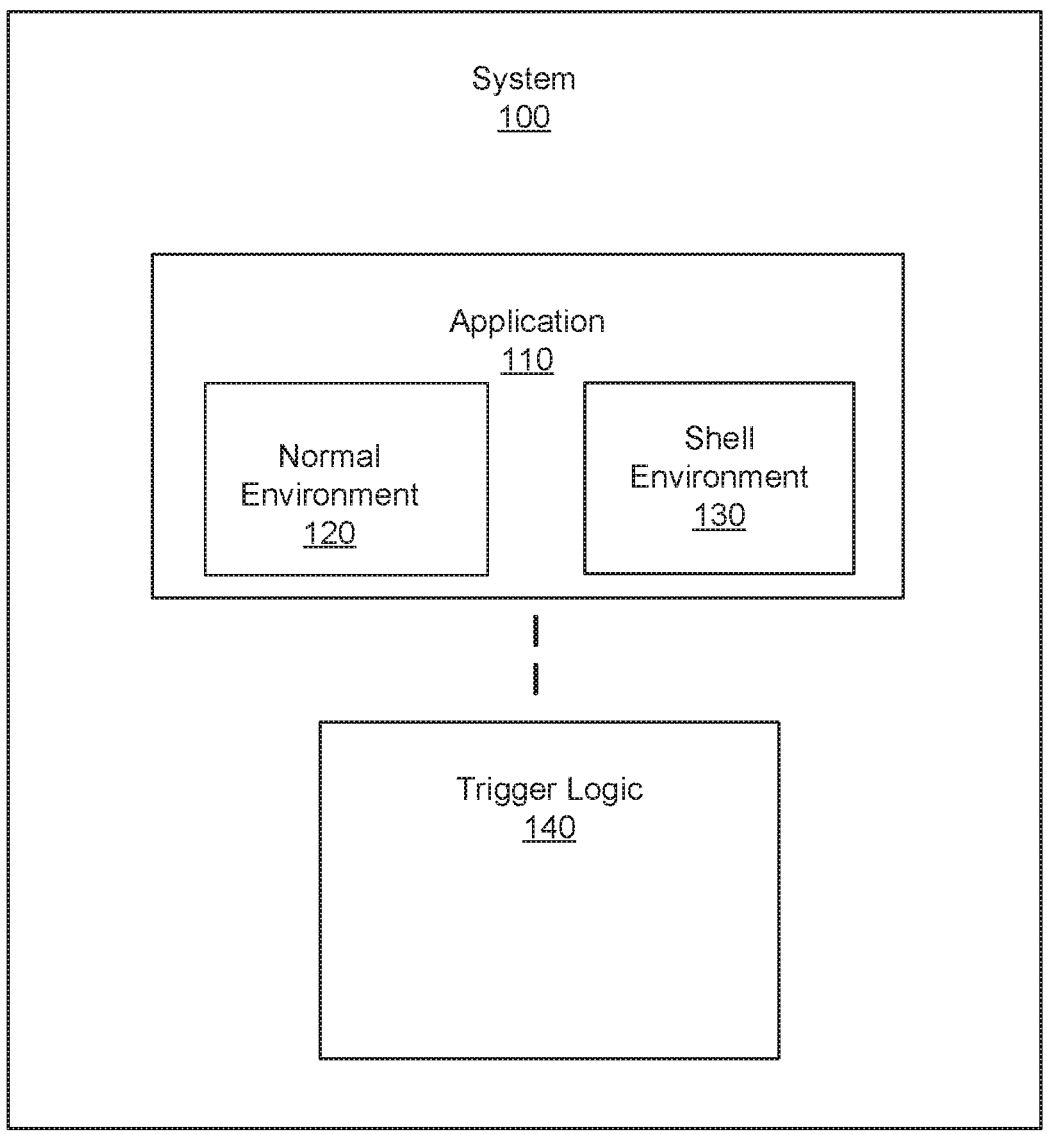
FIG. 1 illustrates one embodiment of a system associated with a fraudulent activity shell.

Embodiments or examples illustrated in the drawings are disclosed below using specific language. It will nevertheless be understood that the embodiments or examples are not intended to be limiting. Any alterations and modifications in the disclosed embodiments and any further applications of the principles disclosed in this document are contemplated as would normally occur to one of ordinary skill in the pertinent art. Described herein are examples of systems, methods, and other embodiments associated with a fraudulent activity shell.

FIG. 1 is an illustration of an example embodiment of a system 100 associated with a fraudulent activity shell. The system 100 includes an application 110. The application 110 may be a banking application such as an online and/or mobile banking application, stock trading application, financial planning application, etc. In one embodiment, the application 110 is hosted by an entity such as a financial institution. Actions are received by the application 110. The application 110 then executes the actions. For example, a action may be a transfer of funds from a first account to a second account. Accordingly, the funds can be debited from the first account and deposited in the second account based on the action using the application 110.

The application 110 is bifurcated into a normal environment 120 and shell environment 130. The normal environment 120 and the shell environment 130 run in tandem. The actions are executed in the normal environment 120. For example, the normal environment may perform actions such as trading, depositing, withdrawing, posting, and holding actions. An action may be one or more actions operating together. When an action posts as being completed in the normal environment 120, the action has been executed. The normal environment 120 reflects executed actions received and processed by the host (e.g., financial institution) of the application 110.

The normal environment 120 may be available to the host of the application 110, but may not be available to the public at large. The shell environment 130 may be available to a broader group of individuals than the normal environment 120. For example, the shell environment 130 may be made available to the public at large. Accordingly, the normal environment 120 may be available to different groups than the shell environment 130. Alternatively, the normal environment 120 may be available to a subset of the groups that have access to the shell environment 130.

The manner in which the normal environment 120 and the shell environment 130 handle actions is dependent on the mode in which the application 100 is operating. The application 110 has two modes: a default mode and a fraudulent activity mode. The default mode is the default setting of the application 110. In the default mode, the normal environment 120 processes actions as they are received and posts the actions once they are processed. Because the application 110 is in the default mode, the actions are being processed in the normal environment 120 and the shell environment 130 mimics the normal environment 120. Thus, the normal environment 120 processes the actions and the shell environment 130 logs the actions. As discussed above, the shell environment 130 is not capable of executing actions. Instead, in the default mode, the shell environment 130 scripts and logs actions as the actions are received.

The fraudulent activity mode is triggered to override the default mode when a fraud is suspected. Specifically, the fraudulent activity mode is triggered by a trigger logic 140. The trigger logic 140 determines that an action is related to a potential fraud by determining that an action satisfies a trigger condition. The trigger condition may include one or more fraudulent activity indicators. In one embodiment, a fraudulent activity indicator may be based on metadata (e.g., an amount, withdrawal account, deposit account, time, date, initiation location, device used to perform action, etc.) of the actions. For example, a fraudulent activity indicator may identify actions that transfer large amounts of funds to an unknown account. Alternatively or additionally, a fraudulent activity indicator may include receiving an action from an unknown device where the action was initiated at an unknown location. In this manner, the trigger logic 140 identifies potentially fraudulent actions by determining that the action meets the one or more fraudulent activity indicators defined as the triggering condition.

When the trigger logic 140 determines that an action meets a trigger condition, the trigger logic 140 triggers the fraudulent activity mode for the application 110. When the trigger logic 140 triggers the fraudulent activity mode, two things happen. One, the potentially fraudulent action is held in the normal environment 120, and consequently, the potentially fraudulent action is not performed. Two, the shell environment 130 no longer mirrors the normal environment 120. Instead, the shell environment 130 logs the action identified by the trigger logic 140 as if the action has been executed. Accordingly, the normal environment 120 may not show the action because it has been held, but the action will appear in the shell environment 130 as if executed.

As discussed above, the normal environment 120 may be visible to the host of the application 110 because the normal environment reflects a true accounting of actions as the actions are processed. However, the normal environment may not be made accessible to the public (e.g., users, customers, potential customers, individuals not employed by the host of the application 110). Instead, the public may only have access to the shell environment 130. The host of the application 110 may also have access to the shell environment 130 so that the host can view the actions as a member of the public would view the actions.

Even when an action is identified as being potentially fraudulent, the action is logged in the shell environment 130. Thus, to a member of the public, the potentially fraudulent action appears to have been processed even though this action will not appear in the normal environment 120 because the action has been held. The shell environment 130 operates and responds as if it was the normal environment 120 such that additional inquires or additional actions appear executed and overall balances appear to reflect the changes. At the same time more detailed logging and tracing is executed after the trigger event. Accordingly, if the potentially fraudulent action is legitimate, the user is unaware of any delay as the scripted and logged activity will be "replayed" and executed in the normal environment 120 after the fraud hold is released as if it was done originally in the normal environment 120 and thus resulting actions with the external systems are executed as they normally would have been. The session activity for the normal environment 120 and the shell environment 130 can be held for as long as defined by the system configuration. Thus another session can be started while disposition of the previous session is being determined. Sessions can stay in a queue to be dispositioned. When the disposition occurs, the session is rolled back and logged if fraud and it is set for replay and execution if valid.

Conversely, if the potentially fraudulent action is fraudulent, the fraudster is unaware that the host of the application 110 is suspicious. Instead, the fraudster will think that the action was processed. Accordingly, in the event of a fraudster, continue to collect evidence to be handed over to law enforcement and track their whereabouts.

Furthermore, in the event of a legitimate user, adjust our model for legitimate use in order to not trigger a false positive next time similar behavior is detected. Therefore, legitimate users are not inconvenienced and the host has an advantage over fraudsters.

In one embodiment, the shell environment 130 returns to the default mode from the fraudulent activity mode for a subsequent action. Thus, each action receives the same treatment. Accordingly, when a subsequent action is received, the trigger logic 140 determines whether the action is potentially fraudulent. If the action is not deemed potentially fraudulent, it is processed in the default mode. Specifically, the action is processed in the normal environment 120, which is mimicked in the shell environment 130. If the action is deemed potentially fraudulent, the potentially fraudulent action is held in the normal environment 120 but logged as being executed in the shell environment 130, as discussed above.

For example, suppose that a first user is logged into a session of online banking for a specific account, and the first user performs one or more actions before logging out. If at least one of the transactions is deemed fraudulent, each of the actions performed during the session is held in the normal environment 120 according to the fraudulent activity mode. However, the next time the specified account is accessed, for example by a second user, the actions are processed according to the default mode. The shell environment 130 shows the actions performed by the first user to the second user as though the actions have been processed.

In another embodiment, once the fraudulent activity mode is triggered, subsequent actions are similarly treated as being potentially fraudulent. Accordingly, a subsequent action may be held in the normal environment 120 and logged in the shell environment 130 until there is manual intervention by the host of the application 110. For example, an agent of the host may review the actions and put the application 110 into the default mode based on his or her review. Additionally or alternatively, the agent of the host may contact the purported user that requested the action to determine if the action is legitimate, and put the shell environment 130 in the default mode based on the contact with the purported user.

In other words, a potential fraud puts a hold on the actions in the normal environment 120 and causes all activity to take place in the shell environment 130. In one embodiment, any external actions to active systems are excepted until the hold is released. When the hold is released, legitimate activity is replayed via the logging and scripting and then executed via the normal environment 120.

Figure 2:
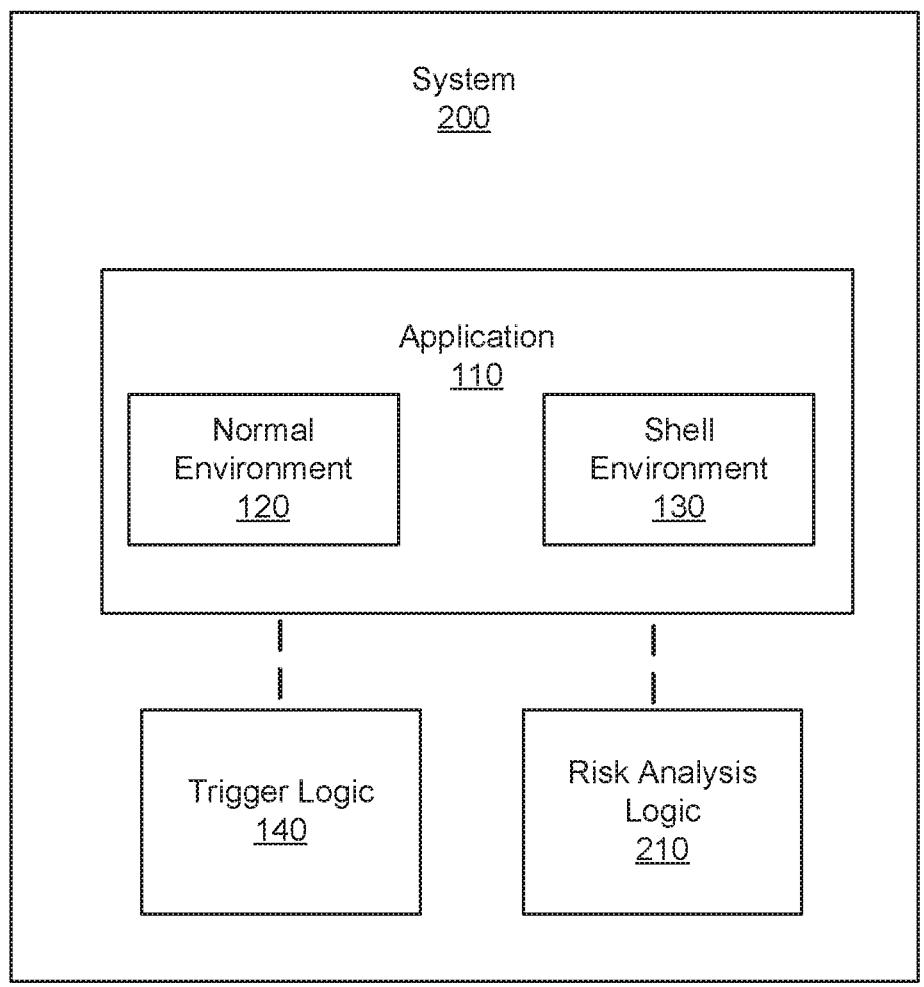
FIG. 2 illustrates one embodiment of a system associated with the fraudulent activity shell having a risk analysis logic.

FIG. 2 illustrates one embodiment of a system 200 associated with a fraudulent activity shell. The system 200 includes an application 110, a normal environment 120, a shell environment 130, and a trigger logic 140 that operate in a similar manner as described above with respect to FIG. 1. The system 200 further includes a risk analysis logic 210.

The risk analysis logic 210 operates when the application 110 is in the fraudulent activity mode. As discussed above, in the fraudulent activity mode actions are held in the normal environment 120. The risk analysis logic 210 performs risk analysis to calculate a fraudulent score for the action when the application 110 is in the fraudulent activity mode. The fraudulent score is indicative of the likelihood that the action is fraudulent. In one embodiment, the fraudulent score is based on the metadata of the action. For example, the metadata may include metadata describing the type of action, location where action was attempted, device on which the action was attempted, and so on. In another embodiment, the metadata may include information about the user attempting the action. In one embodiment, a user is identified based on identity information (e.g., social security number, account number, username) provided by the user attempting the action.

In another embodiment, the action can be verified based on the fraudulent score. For example, the fraudulent score may be compared to a minimum threshold value. In another embodiment, predetermined action steps are selected based on the fraudulent score. For example, if the risk analysis logic 210 determines that the fraudulent score does not meet a threshold value, the trigger logic 140 may cause the application 110 to re-enter the default mode such that subsequent actions are executed in the default mode. In another embodiment, the predetermined action steps may identify ways to remediate the hold on the action, such as by confirming the action with an account holder. In another example, suppose that the risk analysis logic 210 determines that the fraudulent score meets or exceeds a threshold value. In this example, the trigger logic 140 may cause the application 110 to enter or stay a fraudulent activity mode.

Figure 3:
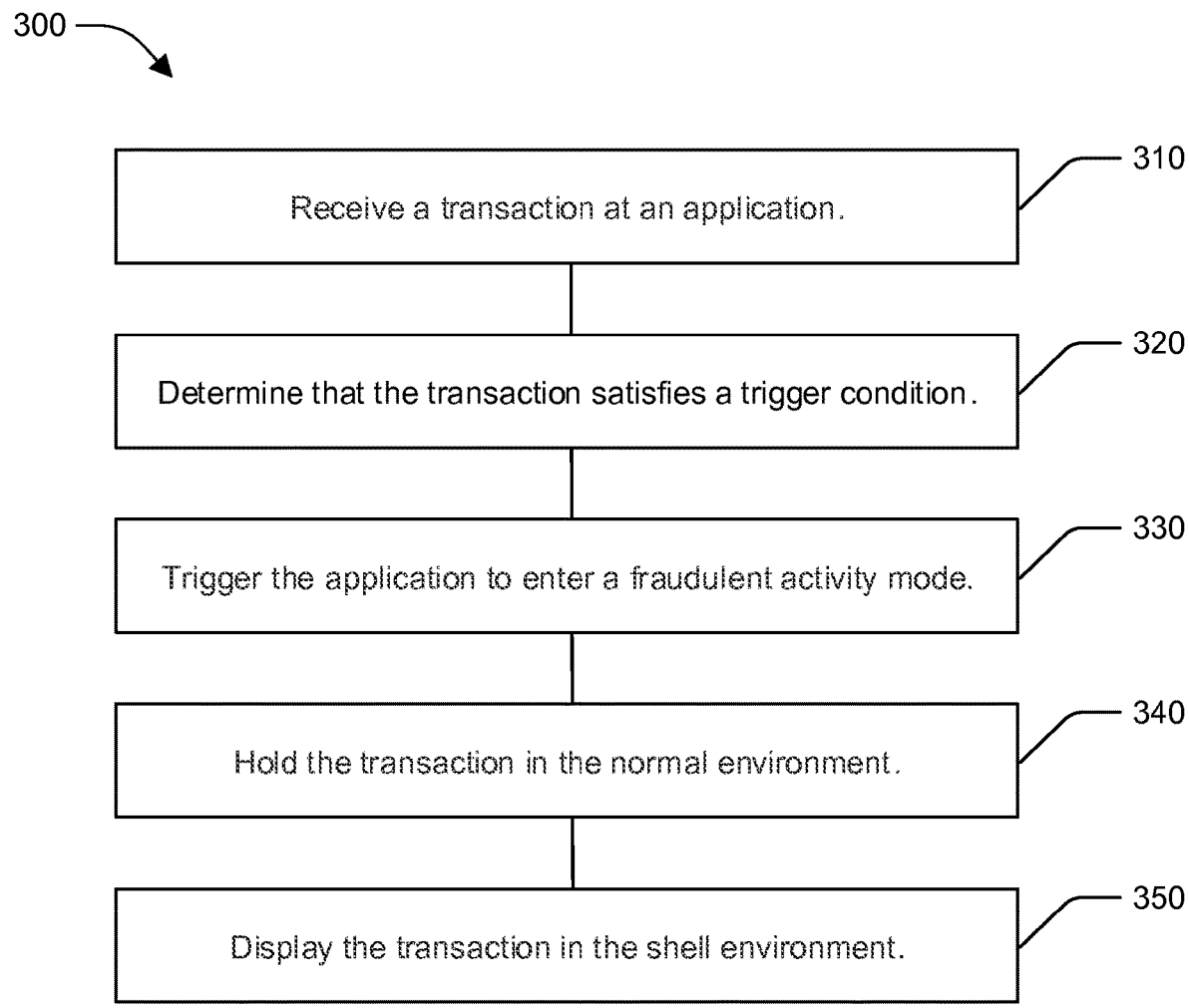
FIG. 3 illustrates one embodiment of a method associated with the fraudulent activity shell.

FIG. 3 illustrates one embodiment of a method associated with a fraudulent activity shell. At 310, an action is received at an application. As discussed above, the application is separated into a normal environment and a shell environment. The application may also include additional environments. For example, the application may also include a test environment for the normal and shell environment in which the applications implementation details can be tested before rolling out the application or changes to the particular environment. In one embodiment, the shell environment and the normal environment have separate testing environments.

At 320, it is determined that the action satisfies a trigger condition. In response to determining that the trigger condition is satisfied, the application is triggered to enter a fraudulent activity mode from a default mode, at 330. As discussed above the trigger condition may include any number of fraudulent activity indicators. For example, to satisfy the trigger condition the fraudulent activity indicators may be defined such that the first fraudulent activity indicator is that the action originated at an unknown device and the second fraudulent activity indicator is that the action be for more than $5,000. If the first fraudulent activity indicator and second fraudulent activity indicator are satisfied (i.e., the action is for $6,000 and originated an unknown device), the trigger condition is satisfied.

If only a single fraudulent activity indicator is met, the action does not satisfy the trigger condition. For example, if the action is for $6,000 but originates at a known device, then the action has satisfied the second fraudulent activity indicator, but has failed to satisfy the first, then the trigger condition is not satisfied. Accordingly, each of the fraudulent activity indicators is met to satisfy the trigger condition. In another embodiment, a specific number of fraudulent activity indicators may be met to satisfy the trigger condition. For example, three fraudulent activity indicators may be set and two of three fraudulent activity indicators must be met to satisfy the trigger condition. In yet another embodiment, a predetermined combination of fraudulent activity indicators must be met to satisfy the trigger condition. Suppose that there are three fraudulent activity indicators. For example, to satisfy the trigger condition, the first fraudulent activity indicator must be met and then either the second or third fraudulent activity indicator must be met. Accordingly, any number of triggers of fraud detection may be utilized.

Once in the fraudulent activity mode, the action is held in the normal environment, at 340. Because the action is held, the action is not executed in the normal environment. However, as discussed above, the held action may appear to be executed in the shell environment, despite the action being held. In this manner. At 350, the action is displayed as executed in the shell environment based, at least in part, on the fraudulent activity mode.

Figure 4:
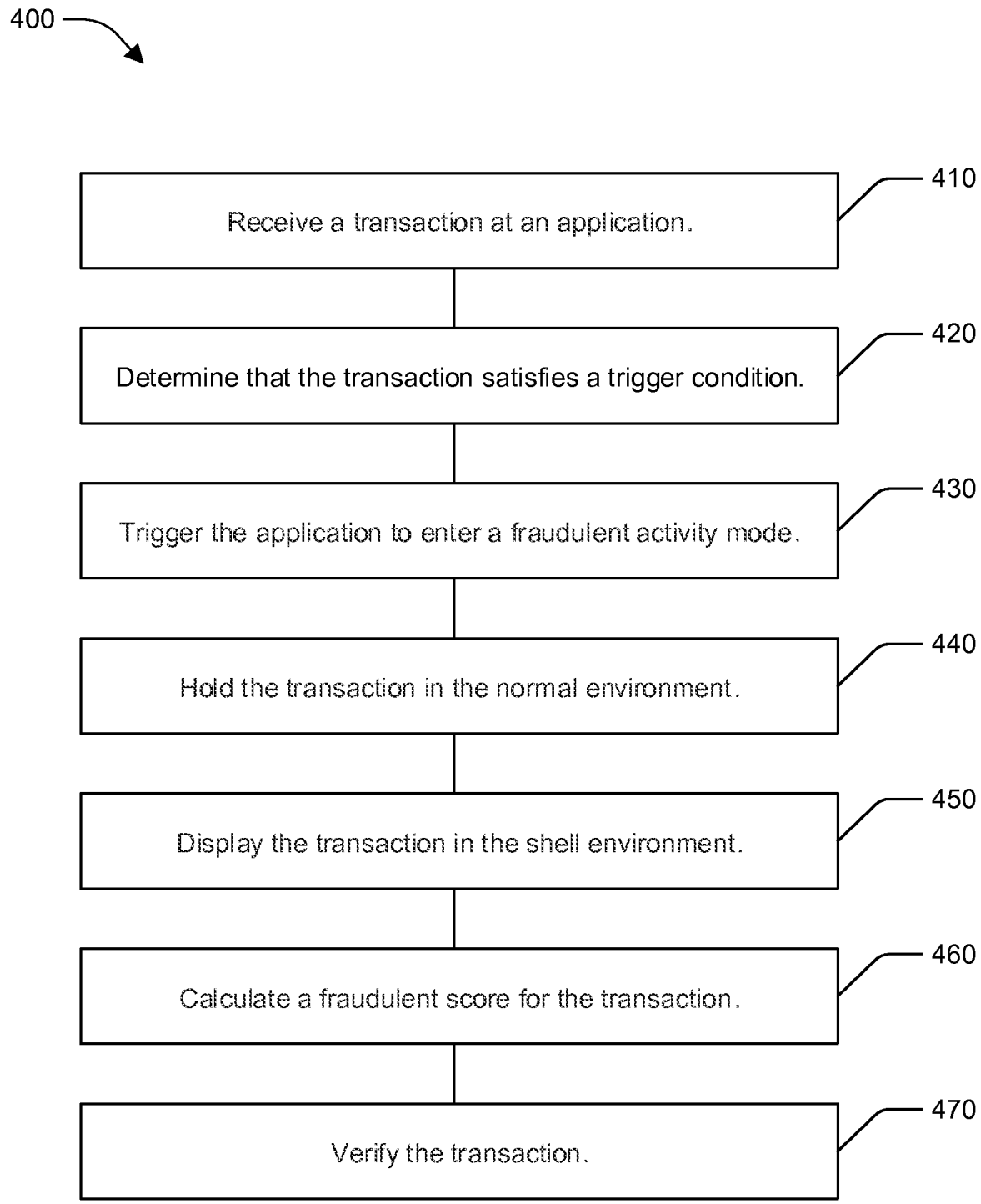
FIG. 4 illustrates one embodiment of a method associated with the fraudulent activity shell having risk scoring.

FIG. 4 illustrates one embodiment of a method associated with automated secondary linking for fraud detection systems previously described employing an alert trigger. Steps 410, 420, 430, 440, and 450 operate in a similar manner as steps 310, 320, 330, 340, and 350, respectively, as described with respect to FIG. 3. Therefore, at 410, an action is received at the application. As discussed above, an action may be a request or action that may or may not result in the movement of funds. For example, the action may include a balance check or activity inquiry or action image or description request verses funds transfer and account balance changes. At 420, it is determined that the action satisfies a trigger condition. At 430, the application is triggered to enter the fraudulent activity mode based, at least in part, on the trigger condition being satisfied. At 440, the action is held in the normal environment in the fraudulent activity mode. At 450, the action is displayed as having been executed in the shell environment.

At 460, a fraudulent score is calculated for the action when the application is in the fraudulent activity mode. The fraudulent score may be calculated based on a number of predetermined parameters that indicate the fraud. For example, a host of the application may determine a number of parameters that indicate fraud. The parameters may be checked against known information about the person attempting the action, for example, the user's known devices, patterns in the user's behavior, etc. In one embodiment, the parameters may be weighted.

At 470, the action is verified based, at least on, the fraudulent score. For example, the action may be verified as having been performed by a known user. Suppose that a user uses a new device to perform an action. The metadata from the action may relate to the user with the exception of the unknown device. The fraudulent score is calculated based on the metadata. In one embodiment, to verify the action, the fraudulent score is compared to a threshold value. In one embodiment, if the fraudulent score meets or exceeds the threshold value, the action may be determined to have been conducted by a known user and is therefore be verified. In another embodiment, predetermined action steps are selected based on the fraudulent score. The predetermined action steps may identify ways to remediate the hold on the action, such as by confirming the action with an account holder.

Accordingly, the verification activity includes monitoring what is going on in the shell environment. Once the activity is verified, a release is generated and the scripting and logging in the shell environment triggers a replay to execute in the normal environment at the point where the fraudulent activity occurred. Thus, once the fraudulent activity is verified as legitimate, the fraudulent activity and following actions are re-executed; thereby making the fraudulent activity and following actions appear normal. If the fraudulent activity is not verified, the normal environment is cleansed of the fraudulent activity and following actions such that the fraudulent activity and following actions are not processed in the normal environment. In one embodiment, the fraudulent activity and following actions are logged and maintained in an audit area.

Accordingly, legitimate users, such as account holders, have more secure transactional experiences and experience less delay because actions appear to have been executed in the shell environment without the apparent delay of added scrutiny. Thus, the actions appear to be executed immediately, while the actions may be scrutinized in the shell environment. Furthermore, by allowing potentially fraudulent actions appear to progress in the shell environment, fraudsters are not inadvertently alerted that fraudulent behavior has been detected, traced, and/or tracked. Accordingly, the system continues to protect legitimate users, whose activity may merit additional scrutiny, by not delaying the actions or locking the users out of the system.

Figure 5:
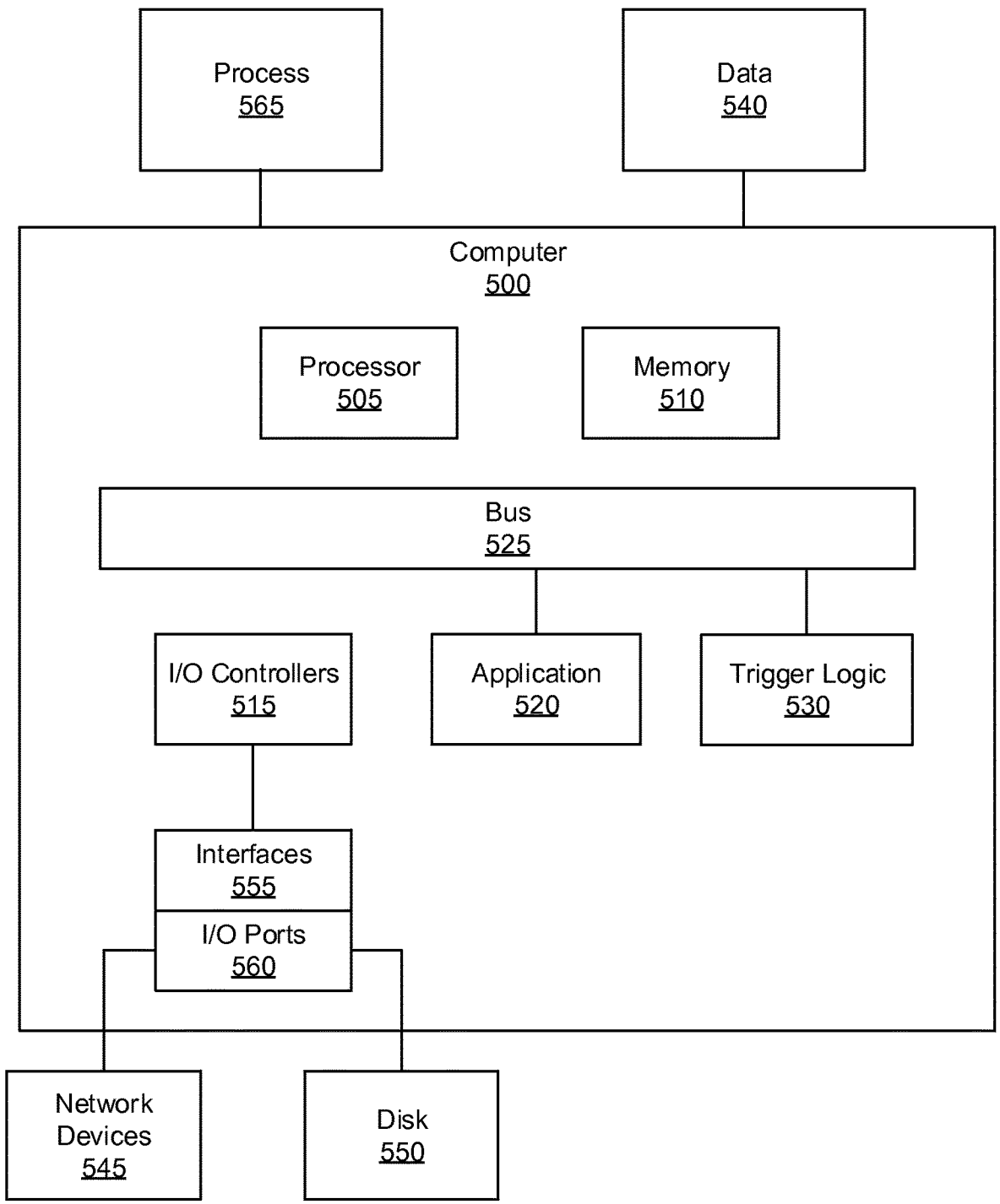
FIG. 5 illustrates one embodiment of an example computer environment associated the fraudulent activity shell.

FIG. 5 illustrates one embodiment of an example computer environment associated with automated secondary linking of fraud detection systems. The computer environment in which the systems and methods described herein, and equivalents, may operate, may include a computer 500. The computer includes a processor 505, a memory 510, and input/output ports 560 operably connected by a bus 525. In one example, the computer 500 may include an application 520 and a trigger logic 530. The application 520 is configured to allow individuals to perform and access actions. As discussed above, the application 520 is bifurcated into a normal environment and a shell environment. The operation of the application 520 is based on the mode of the application. The trigger logic 530 is configured to trigger modes of the application 520 based on information about the action. For example, the trigger logic may trigger the application 520 to enter a fraudulent activity mode.

In different examples, the application 520 and the trigger logic 530 may be implemented in hardware, a non-transitory computer-readable medium with stored instructions, firmware, and/or combinations thereof. While the application 520 and the trigger logic 530 are illustrated as hardware components attached to the bus 525, it is to be appreciated that in one example, the application 520 and/or the trigger logic 530 could be implemented in the processor 505.

In one embodiment, the application 520 is a means (e.g., hardware, non-transitory computer-readable medium, firmware) for executing actions for both individuals and an entity hosting the application 520. The trigger logic 530 is a means (e.g., hardware, non-transitory computer-readable medium, firmware) for triggering modes in the application 520. The means may be implemented, for example, as an ASIC programmed to trigger the application to process actions differently in each environment. The means may also be implemented as stored computer executable instructions that are presented to computer 500 as data 540 that are temporarily stored in memory 510 and then executed by processor 505.

Generally describing an example configuration of the computer 500, the processor 505 may be a variety of various processors including dual microprocessor and other multi-processor architectures. A memory 510 may include volatile memory and/or non-volatile memory. Non-volatile memory may include, for example, ROM, PROM, and so on. Volatile memory may include, for example, RAM, SRAM, DRAM, and so on.

A disk 550 may be operably connected to the computer 500 via, for example, an input/output interface (e.g., card, device) 555 and an input/output port 560. The disk 550 may be, for example, a magnetic disk drive, a solid state disk drive, a floppy disk drive, a tape drive, a Zip drive, a flash memory card, a memory stick, and so on. Furthermore, the disk 550 may be a CD-ROM drive, a CD-R drive, a CD-RW drive, a DVD ROM, and so on. The memory 510 can store a process 565 and/or a data 540, for example. The disk 550 and/or the memory 510 can store an operating system that controls and allocates resources of the computer 500.

The bus 525 may be a single internal bus interconnect architecture and/or other bus or mesh architectures. While a single bus is illustrated, it is to be appreciated that the computer 500 may communicate with various devices, logics, and peripherals using other busses (e.g., PCIE, 1394, USB, Ethernet). The bus 525 can be types including, for example, a memory bus, a memory controller, a peripheral bus, an external bus, a crossbar switch, and/or a local bus.

The computer 500 may interact with input/output devices via the i/o interfaces 506 and the input/output ports 560. Input/output devices may be, for example, a keyboard, a microphone, a pointing and selection device, cameras, video cards, displays, the network devices 545, the disk 550, and so on. The input/output ports 560 may include, for example, serial ports, parallel ports, and USB ports.

The computer 500 can operate in a network environment and thus may be connected to the network devices 545 via the I/O interfaces 555, and/or the I/O ports 560. Through the network devices 520, the computer 500 may interact with a network. Through the network, the computer 500 may be logically connected to remote computers. Networks with which the computer 500 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the method.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium", as used herein, is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage medium may include, but are not limited to, a computer-readable medium, a floppy disk, a flexible disk, a hard disk, a magnetic tape, other magnetic medium, an ASIC, a CD, other optical medium, a RAM, a ROM, a memory chip or card, a memory stick, and other media that can store instructions and/or data. Computer storage medium described herein are limited to statutory subject matter under 35 U.S.C § 101.

"Logic", as used herein, includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm to perform one or more of the disclosed functions/methods, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic component. Similarly, where a single logic component is described, it may be possible to distribute that single logic component between multiple physical logic components. In some embodiments, one or more of the components and functions described herein are implemented using one or more of the logic components. Logic as described herein is limited to statutory subject matter under 35 U.S.C § 101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks. The methods described herein is limited to statutory subject matter under 35 U.S.C § 101.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims, which satisfy the statutory subject matter requirements of 35 U.S.C. § 101.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system, comprising: a processor that executes the following:

A processor that executes the following:

an application configured to receive a request for an action by a user, the application having a default mode having a normal environment that initiates action with external systems and a shell environment that mirrors the normal environment, but is not capable of initiating actions with external systems; and a trigger logic configured to:

determine that the requested action satisfies a trigger condition; and trigger the application to override the default mode and enter a fraudulent activity mode in response to determining that the requested action satisfies the trigger condition, wherein the normal environment is configured to hold the action in the fraudulent activity mode such that the action cannot be executed, and wherein the shell environment is configured to stop mirroring the normal environment and to display the requested action to the user such that the requested action appears to the user to be executed;

a risk analysis logic configured to calculate a fraudulent score for the action when the application is in the fraudulent activity mode, wherein the risk analysis logic is further configured to verify the action, and wherein upon verification the action is released and replayed in the normal environment.

2. The system of claim 1, wherein the normal environment is configured to process the action in the default mode, and wherein the shell environment is configured to mimic the normal environment in the default mode.

3. The system of claim 1, wherein the action is a financial action, and wherein the trigger condition indicates that the financial action is fraudulent.

4. The system of claim 1, wherein the trigger condition includes a first fraudulent activity indicator and a second fraudulent activity indicator.

5. The system of claim 1, wherein the trigger condition is defined by a fraudulent activity indicator, and wherein the fraudulent activity indicator is based, at least in part, on metadata of the action.

6. The system of claim 1, wherein the trigger logic is configured to cause the application to maintain the fraudulent activity mode for a subsequent action.

7. The system of claim 1, wherein the trigger logic is configured to cause the application to re-enter the default mode for a subsequent action.

8. A method, comprising:
receiving, via a processor, a request for an action by a user at an application, the
application having a default mode having a normal environment that initiates action with external systems and a shell environment that mirrors the normal environment, but is not capable of initiating actions with external systems;
determining, via a processor, that the requested action satisfies a trigger condition;
triggering, via a processor, the application to override the default mode and enter a fraudulent activity mode in response to determining that the requested action satisfies the trigger condition;
holding, via a processor, the requested action in the normal environment based, at least in part, on the fraudulent activity mode;
stopping, via a processor, the mirroring of the normal environment in the shell environment;
displaying to the user, via a processor, the requested action such that the requested action appears to the user to be executed; and
calculating, via a processor, a fraudulent score for the action when the application is in the fraudulent activity mode, and verifying, via a processor the action based, at least in part, on the fraudulent score.

9. The method of claim 8, wherein the trigger condition is defined by one more fraudulent activity indicators, and wherein a fraudulent activity indicator is based, at least in part, on metadata of the action.

10. The method of claim 8, further comprising re-entering the default mode for a subsequent received action.

11. The method of claim 8, further comprising maintaining the fraudulent activity mode for a subsequent received action.

12. A non-transitory computer-readable medium storing computer-executable instructions that when executed by a computer cause the computer to perform a method, the method comprising:
receiving a request for an action from a user at an application, the application having a default mode having a normal environment that initiates action with external systems and a shell environment that mirrors the normal environment, but is not capable of initiating actions with external systems;
determining that the requested action satisfies a trigger condition;
triggering the application to override the default mode and enter a fraudulent activity mode in response to determining that the requested action satisfies the trigger condition;
holding the requested action in the normal environment based, at least in part, on the fraudulent activity mode,
stopping the mirroring of the normal environment by the shell environment and displaying to the user the requested action such that the requested action appears to the user to be executed; and
calculating a fraudulent score for the action when the application is in the fraudulent activity mode, and verifying the action based at least in part on the fraudulent score.

13. The non-transitory computer-readable medium of claim 12, further comprising:
comparing the fraudulent score to a threshold value;
re-entering the default mode when the fraudulent score meets the threshold value; and executing the action in the default mode.

14. The non-transitory computer-readable medium of claim 12, wherein the trigger condition is defined by one more fraudulent activity indicators, and wherein a fraudulent activity indicator is based, at least in part, on metadata of the action.

15. The non-transitory computer-readable medium of claim 12, further comprising reentering the default mode for a subsequent received action.

16. The non-transitory computer-readable medium of claim 12, further comprising maintaining the fraudulent activity mode for a subsequent received action.

* * * * *